US012700073B2

(12) United States Patent
Bhattacharjee et al.

(10) Patent No.: US 12,700,073 B2
(45) Date of Patent: Aug. 4, 2026

(54) LOCAL ADAPTIVE CONTRAST ENHANCEMENT TECHNIQUES

(71) Applicant: Intel Corporation, Santa Clara, CA (US)

(72) Inventors: Susanta Bhattacharjee, Bangalore (IN); Happy M. Ramani, Gujarat (IN)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 18/399,262

(22) Filed: Dec. 28, 2023

(65) Prior Publication Data

US 2025/0217951 A1    Jul. 3, 2025

(51) Int. Cl.

| | |
|---|---|
| *G06T 5/94* | (2024.01) |
| *G06T 3/4007* | (2024.01) |
| *G06T 5/40* | (2006.01) |
| *G06T 5/70* | (2024.01) |
| *G06V 10/60* | (2022.01) |

(52) U.S. Cl.
CPC .............. *G06T 5/94* (2024.01); *G06T 3/4007* (2013.01); *G06T 5/40* (2013.01); *G06T 5/70* (2024.01); *G06V 10/60* (2022.01)

(58) Field of Classification Search
CPC  G06T 5/94; G06T 3/4007; G06T 5/40; G06T 5/70; G06V 10/60
See application file for complete search history.

(56) References Cited

U.S. PATENT DOCUMENTS

| | | | |
|---|---|---|---|
| 2016/0335751 A1* | 11/2016 | Sidar | ......................... G06T 5/40 |
| 2018/0089799 A1* | 3/2018 | Johnson | ................. G06T 3/403 |
| 2025/0191152 A1* | 6/2025 | Le | ............................ G06T 5/92 |

OTHER PUBLICATIONS

Intel Corporation, "Localized Adaptive Contrast Enhancement (LACE), Graphics Driver—Technical White Paper," Revision 1, Sep. 2018 (12 pages).

* cited by examiner

*Primary Examiner* — Wassim Mahrouka
(74) *Attorney, Agent, or Firm* — Alliance IP, LLC

(57)  ABSTRACT

In one embodiment, an apparatus includes hardware circuitry to determine a tile brightness value and a tile contrast value for each respective tile of a plurality of tiles that together comprise an input frame. The circuitry obtains a first enhancement factor (e.g., from a first lookup table) based on the tile brightness value and a second enhancement factor (e.g., from a second lookup table) based on the tile contrast value. The circuitry generates an output frame based on the first enhancement factor and the second enhancement factor.

20 Claims, 10 Drawing Sheets

400

402 — Access frame data

404 — Determine, for each tile of frame, tile brightness value and tile contrast value 406 — Obtain first enhancement factor (alpha_brightness) and second enhancement factor (alpha_contrast) from FBLUT and FCLUT, respectively 408 — Determine AS' and SBL values for each tile of the frame 410 — Apply spatial filtering/smoothing to AS' and SBL values 412 — Apply temporal filtering/smoothing to AS' and SBL values 414 — Generate output frame using AS' and SBL values

400

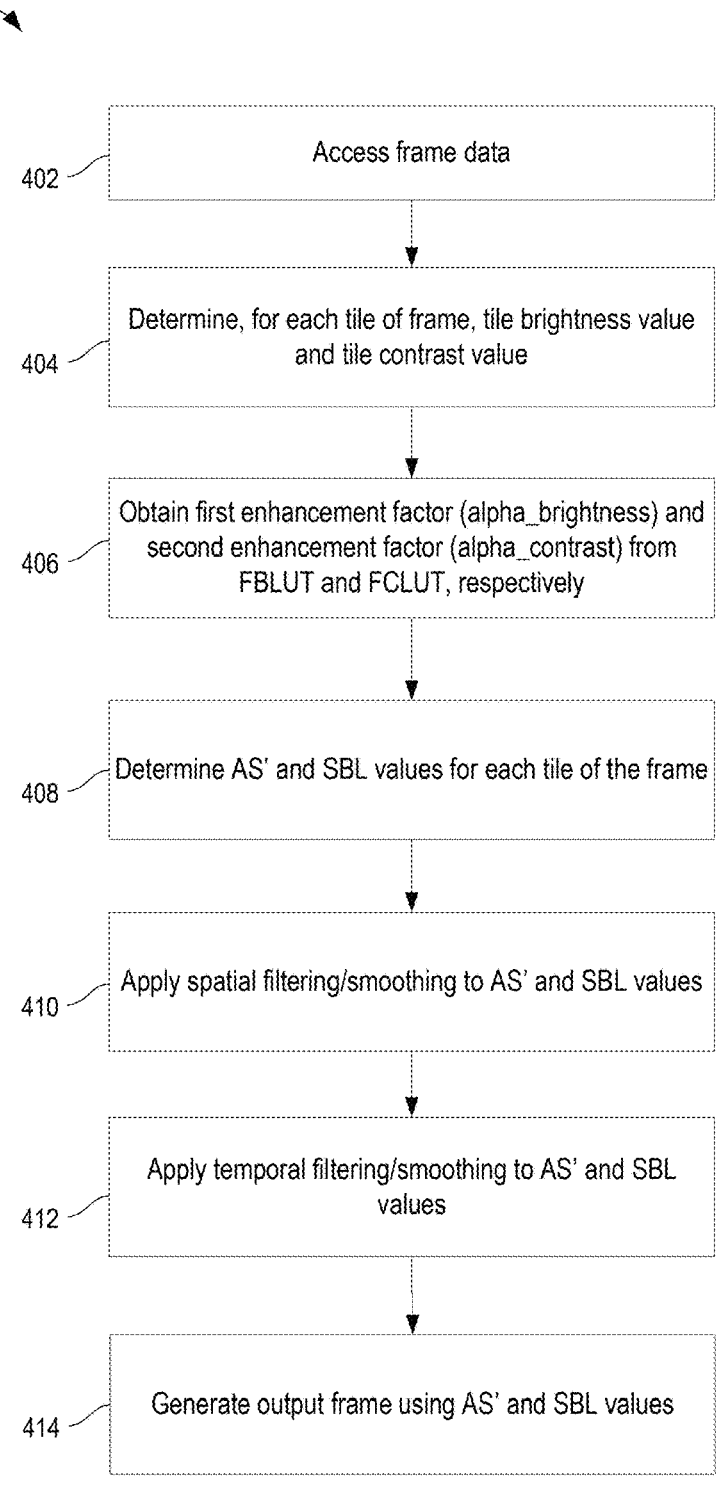

402 — Access frame data

404 — Determine, for each tile of frame, tile brightness value and tile contrast value 406 — Obtain first enhancement factor (alpha_brightness) and second enhancement factor (alpha_contrast) from FBLUT and FCLUT, respectively 408 — Determine AS' and SBL values for each tile of the frame 410 — Apply spatial filtering/smoothing to AS' and SBL values 412 — Apply temporal filtering/smoothing to AS' and SBL values 414 — Generate output frame using AS' and SBL values

FIG. 4

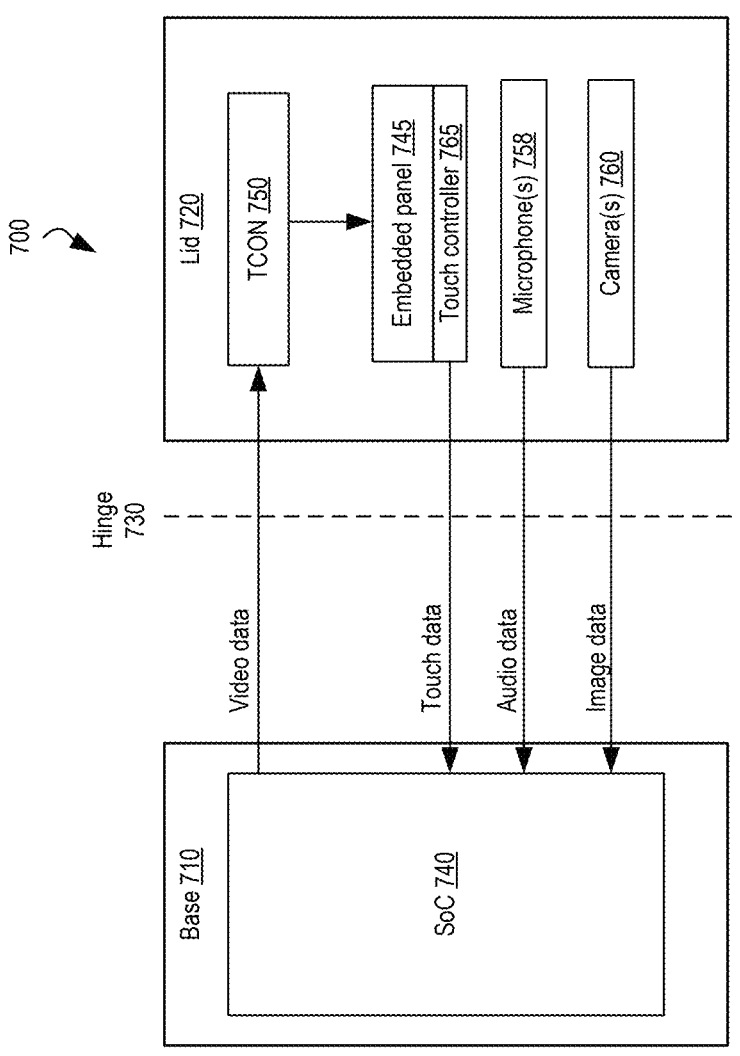
FIG. 7

LOCAL ADAPTIVE CONTRAST ENHANCEMENT TECHNIQUES

BACKGROUND

Contrast is a key element in visual perception, as the human eye is very sensitive to differences in contrast. Increased contrast is effective in breaking up stagnation, providing clarity, and helping the human eye to distinguish between different objects. Further, sharp contrast images create a "push and pull" effect on the human eye, and draw the attention where focus is needed, which is why high local contrast looks appealing to users.

BRIEF DESCRIPTION OF THE DRAWINGS

FIG. 4 illustrates a flow diagram of an example process of modifying an image to be displayed to enhance contrast in accordance with embodiments of the present disclosure.

FIG. 7 illustrates an example block diagram of a computing device in which aspects of the present disclosure may be incorporated.

DETAILED DESCRIPTION

Figure 1:
FIG. 1 illustrates an example contrast enhancement technique in accordance with embodiments of the present disclosure.

In the following description, specific details are set forth, but aspects of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term. For example, description of a lid of a mobile computing device that can rotate to substantially 360 degrees with respect to a base of the mobile computing includes lids that can rotate to within several degrees of 360 degrees with respect to a device base.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to aspects of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims. While aspects of the present disclosure may be used in any suitable type of computing device, the examples below describe example mobile computing devices/environments in which aspects of the present disclosure can be implemented.

Aspects of the present disclosure provide techniques for enhancing local contrast in an adaptive manner with lower memory consumption. The term "adaptive" may refer to ambient and content-dependent local corrections, e.g., enhancements over smaller regions of the frame under different ambient lighting conditions. Currently, local contrast enhancement may be performed using a histogram equalization technique. In these techniques, hardware (e.g., a display engine of a graphics processing unit) splits a frame buffer into square shaped tiles (e.g., 128-pixel squares or 256-pixel squares) located at fixed positions within a frame and calculates, for each frame, a histogram for each tile. A software algorithm then reads the histogram for each tile, computes image enhancement lookup table values (IETs) for the tiles, and programs the display engine hardware accordingly. With this technique, a processor (e.g., CPU) may be quite busy reading the histogram information and writing IETs into hardware, even though the underlying algorithm processing requires much less time.

Embodiments herein provide enhancements to LUT-based techniques, such as the example described above. In particular embodiments, for example, a variant of an unsharp masking (USM) technique can be employed, using two different user-configurable enhancement factors for contrast (e.g., FCLUT described below) and brightness (e.g., FBLUT described below) for enhancing images. The factors can address the over-sharpening problems that are common to the USM technique using a hardware-driven algorithm that requires less data movement between hardware and software (e.g., fewer reads/writes), thus, saving power when compared to the existing techniques that involve many more hardware reads/writes.

FIG. 1 illustrates an example contrast enhancement technique in accordance with embodiments of the present disclosure. Aspects shown in FIG. 1 and described below may be implemented in hardware circuitry, e.g., within a graphics processing unit (e.g., in display engine 513 of graphics processing unit 512 of FIG. 5), within a timing controller (TCON) of a display (e.g., TCON 519 of FIG. 5), or in another location (e.g., within other processing circuitry).

In embodiments described herein, each frame can be first divided into rectangular or square tiles. As the human eye generally can see objects within a 2 degree angular range, the tile size may depend on the display's pixels per inch (PPI). For example, in certain embodiments, 64×64 pixel square shaped tiles can be used for a 1920×1080 resolution (e.g., that of a standard 13-15 inch laptop display), which would yield approximately 510 tiles (# of tiles=round_up (1920/64)*round_up (1080/64)=510), while 4K resolution with the same display size might use double sized tiles of 128×128 pixels (also yielding approximately 510 tiles). In some embodiments, the positions of the tiles can be fixed, while other embodiments may allow for programmable tile positions.

As shown in FIG. 1, certain aspects can be processed for each frame on a per-pixel basis (boxes with a white background in FIG. 1) or on a per-tile basis (boxes with a shaded background in FIG. 1). In the example technique, a frame is first processed to determine a luma for each pixel in the frame. The luma may represent the brightness of the pixel. Brightness may refer to a relative intensity of the energy output of a light source, i.e., the pixel in this example. In some embodiments, the luma can be determined from a weighted sum of the linear RGB components of the pixel, the values of which can each range from 0-255 each. An example equation for determining luma (Y) using standard RGB color intensities is:

$$\text{Luma } (Y) = 0.299 * R + 0.587 * G + 0.114 * B.$$

However, other weights can be used for each of the RGB color intensities, e.g.:

$$\text{Luma } (Y) = 0.2126 * R + 0.7152 * G + 0.0722 * B.$$

A tile brightness value can be determined for each tile of the frame by taking the average luma of each pixel within the tile consisting of N pixels, e.g.:

$$\text{Tile Brightness} = \frac{\sum_{1}^{N} \text{Luma } (Y)}{N}.$$

Next, a tile histogram can be generated (at 103) for each tile of the frame. The histogram can represent a pixel intensity (brightness) distribution in the frame, and can be created using equally sized bins for the determined pixel luma for the tile, with each bin representing a count of the number of pixels having a luma in that bin's luma range. As an example, the histogram may include 32 bins, and 8 bpc images/frames can bin luma values of [0-7] into bin 0, luma values of [8-15] in bin 1, and so on. The tile histograms can then be stored in a histogram buffer 104.

A tile contrast value can then be determined (at 106) for each tile of the frame based on the tile histogram. Contrast may refer to a normalized distance between the highest and lowest populated bin in the tile histogram. For instance, the tile contrast can be determined according to:

$$\text{Tile Contrast} = \frac{(\text{Bright bin index} - \text{Dark bin index})}{\text{Max bin Index}};$$

where Dark bin index refers to the bin index at which the cumulative histogram count total reaches 4% of the pixel count in the tile, counting from the lowest bin index to the highest; Bright bin index refers to the bin index at which cumulative histogram reaches 90% of the total pixel count while counting from highest bin index to the lowest; and Max bin Index refers to the maximum possible separation of bright and dark bin indices (indicating a maximum possible contrast value). These thresholds (i.e., 4% and 90%) may be used because certain bins may have a very low pixel count, and considering those bins as either the highest or lowest may not determine an accurate contrast as perceived by a human eye. Therefore, the thresholds above can be used to determine the points considered as the darkest or brightest bins. Other thresholds can be used than the examples of 4% and 90%, as those are just examples.

The contrast of each tile can then be enhanced according to the disclosed techniques. An existing contrast enhancement technique is unsharp masking (USM), which can cause over-sharpening in low-contrast and low-brightness regions. In addition, noise in darker regions can be over-amplified with the standard USM technique as well. However, embodiments herein can overcome these limitations by using two user-configurable look up tables for enhancement factors to be used: FBLUT 105 for brightness and FCLUT 108 for contrast. Each of these tables may include a number of samples with values in each entry having a respective alpha value (which may also be referred to as "enhancement factors" herein) for brightness or contrast that can be used as described further below for determining contrast enhancement values. Each alpha value may be within the range 0-1, in certain embodiments. These lookup tables are in contrast to existing techniques that require math functions (e.g., power functions or divisions) to be encoded in hardware.

Figure 2A:
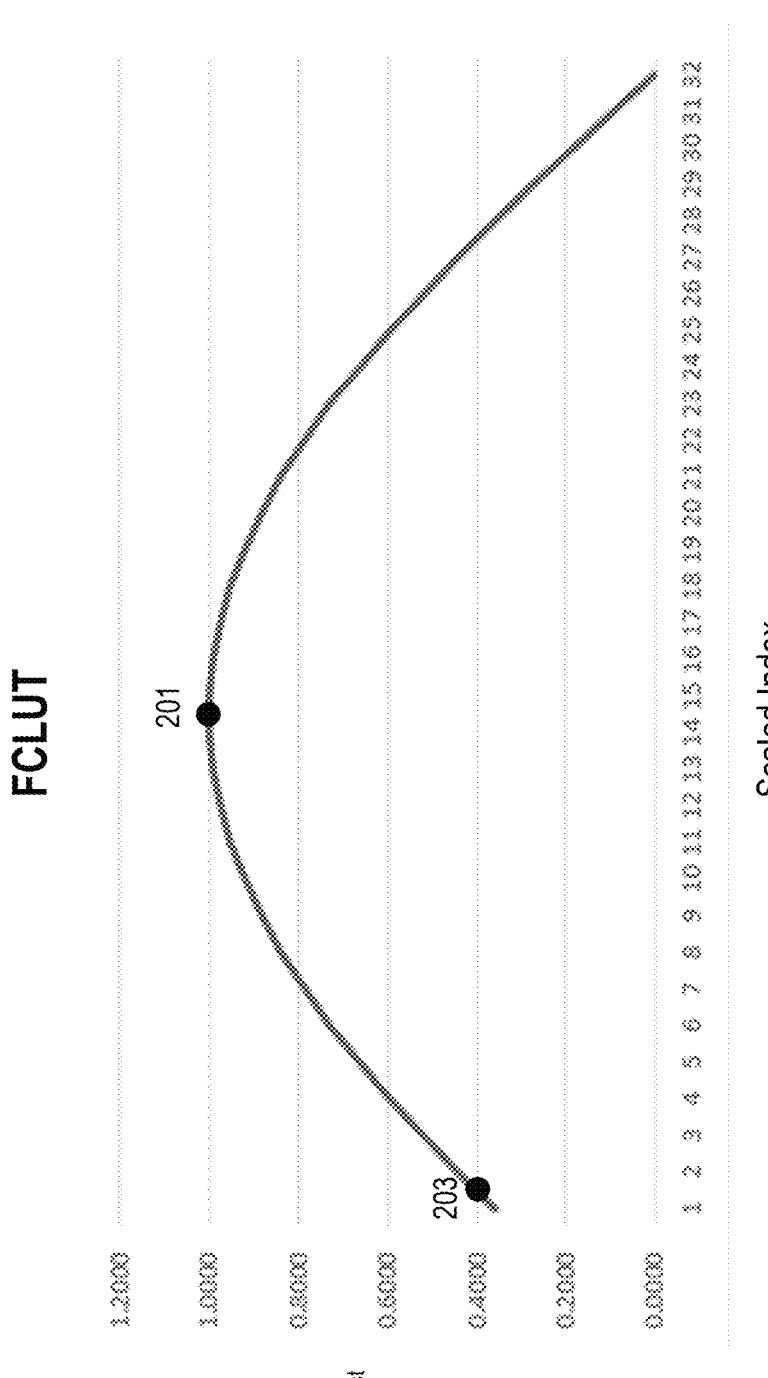
FIGS. 2A-2B illustrate example lookup table values for use in the contrast enhancement techniques of the present disclosure.
Figure 2B:
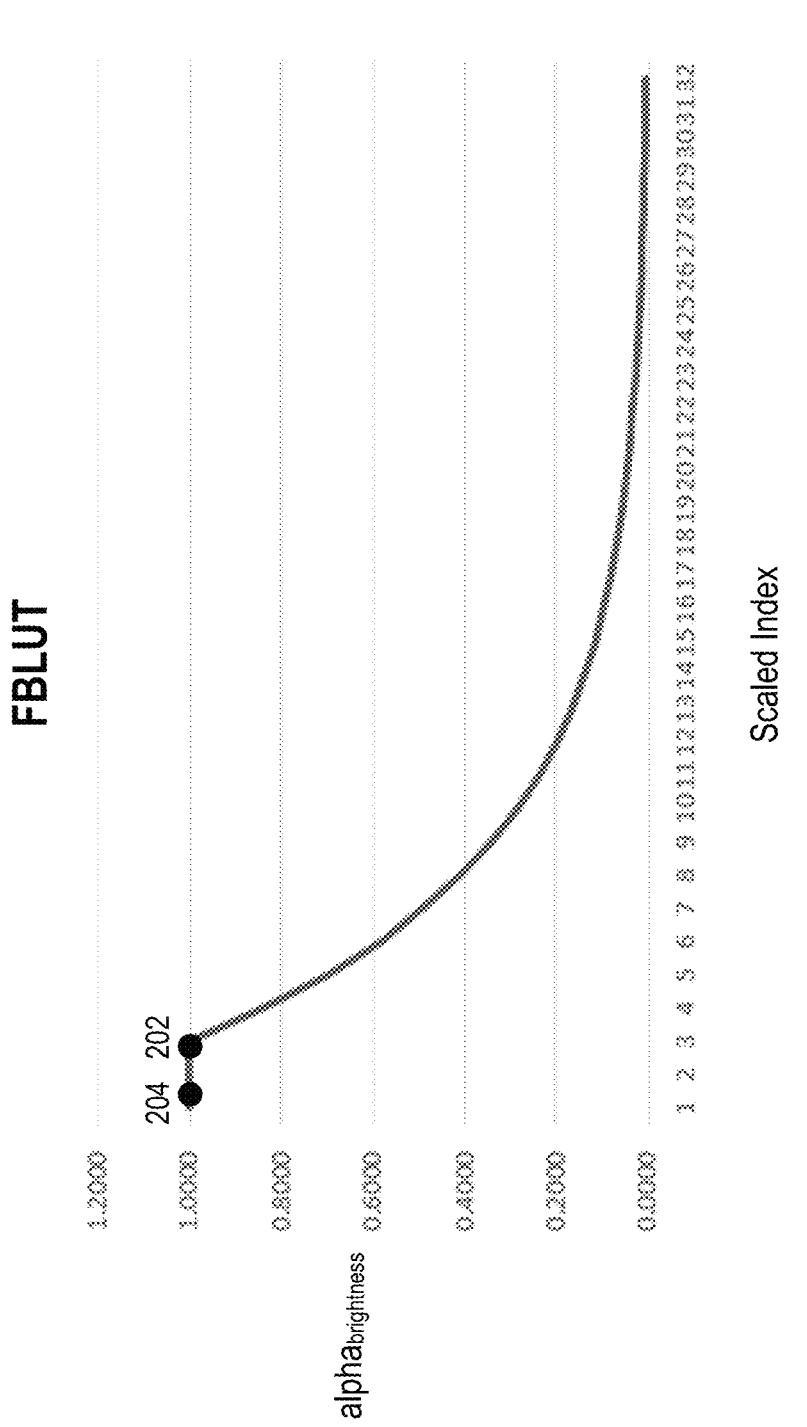

FIGS. 2A-2B illustrate example lookup table values for use in the contrast enhancement techniques of the present disclosure. In particular, FIG. 2A illustrates example alpha values for an FCLUT with 32 samples and FIG. 2B illustrates example alpha values for an FBLUT with 32 samples. Although each table includes 32 samples in the example shown, the number of samples may be any suitable number. Each sample (the x-axis of FIGS. 2A-2B) may correspond to a scaled contrast/brightness value for a tile, and a scale factor for determining which alpha is to be used in the table being determined by determining a normalized contrast/brightness of the tile multiplied by the number of samples in the table. That is, a tile having a normalized contrast/brightness value that is low will use alpha values on the left side of the charts shown in FIGS. 2A-2B, while a tile having a normalized contrast/brightness value that is high will use alpha values on the right side of the charts shown in FIGS. 2A-2B.

In certain embodiments, the FCLUT alpha values can be chosen to have a Gaussian distribution (e.g., similar to the one shown in FIG. 2A). The Gaussian distribution can cause tiles with very low and very high contrast to not be corrected much, and cause tiles with a medium contrast to be corrected relatively more. In certain embodiments, the FBLUT alpha values can be chosen to be generally decreasing across the samples, so that brighter tiles are not altered much and tiles with medium contrast and mid to low brightness are enhanced relatively more. For instance, referring to FIG. 2A, tiles having lower and higher contrast values may be enhanced relatively less (i.e., lower alpha values) than tiles having mid-range contrast values, and referring to FIG. 2B, tiles having lower brightness values may be enhanced more than tiles having higher brightness values. The distributions shown may be chosen at least for the following reasons. If tiles with high contrast and high brightness values are enhanced, over-correction can result. Further, enhancing tiles with low contrast values might result in noise. Accordingly, mid-range values may have a better scope for enhancement, and the distributions of the FCLUT and FBLUT can be chosen accordingly, e.g., similar to those shown in FIGS. 2A-2B. However, aspects of the present disclosure may be implemented with other distributions than those shown and described.

Turning back to FIG. 1, output luma for the pixels of the enhanced frame image can then be determined using the FCLUT and FBLUT values, using Adaptive Strength (AS) and Scaled Blurred Luma (SBL) values determined at 110 using FCLUT and FBLUT. The output luma values can be determined (at 118), for example, according to the following equations:

$$OutLuma = AS' * InLuma - \text{Scaled Blurred Luma};$$

where OutLuma refers to the pixel luma for the image output by the enhancement, InLuma refers to the pixel luma of the image originally generated for display (input to the enhancement algorithm), and:

$$AS(\text{Adaptive Strength}) = \text{Programmed Fixed Strength} * \text{Alpha};$$

$$AS' = 1 + AS; \text{ and}$$

$$\text{Scaled Blurred Luma } (SBL) = AS * \text{Blurred Luma}.$$

Blurred Luma may refer to an output of a spatial low pass filter on a local region on an image. In some instances, Average Luma for the pixel's tile can be used for this value (i.e., Blurred Luma=Average Luma). Average Luma can be determined based on a weighted average of the histogram bins where the weight of a bin is normalized bin index, e.g., according to the following:

$$Avg \text{ Luma} = \frac{\text{sum}\left([\text{Bin Index}] * \dfrac{[\text{Bin Pixel Count}]}{\text{Max Bin Index}}\right)}{\text{Total Pixel Count}}.$$

Programmed Fixed Strength may be a user-configurable constant value, which the hardware can access from software. Alpha may be a function of the tile's contrast and brightness, and dictated by the alpha values in FCLUT and FBLUT, respectively. For example, Alpha may be determined by multiplying the alpha value obtained from a lookup in FBLUT (a first enhancement factor) and the alpha value obtained from a lookup in the FCLUT (a second enhancement factor), as shown:

$$Alpha = alpha_{brightness} * alpha_{contrast}$$

The alpha values may be obtained from lookups in FBLUT and FCLUT based on the tile brightness and tile contrast values, respectively, described above, with the alpha value being chosen based on a scaled brightness or contrast value. For instance, referring to the example LUTs shown in FIGS. 2A-2B, a tile having a low-range brightness value and mid-range contrast value may obtain values of approximately 1 for each of the alpha values (see points 201, 202 in FIGS. 2A, 2B, respectively). As another example, a tile having a low-range brightness value and low-range contrast value may obtain values of approximately 1 for the brightness alpha value (point 203 in FIG. 2A) and approximately 0.4 for the contrast alpha value (point 204 in FIG. 2B).

AS' and SBL are values computed for each tile, as shown in FIG. 1. The AS' and SBL values for each tile are stored in memory (e.g., in random access memory (RAM) 116 as shown). This is in contrast to existing solutions, which can require IETs (lookup tables) to be stored for each tile. This difference can save significant amounts of memory resources.

In certain embodiments, spatial filtering (e.g., smoothing) can be performed to reduce sharp differences at the tile boundaries. For example, because AS' and SBL values are calculated per tile, pixels of adjacent tiles may be enhanced differently. This can cause tile boundaries to be visible on the image output by the enhancement algorithm. These inter-tile variations of enhancement factors can be minimized by using a spatial filter (112). For example, the parameters AS' and SBL of a current tile can be smoothened by using a weighted average of nearby tiles. For example, referring to FIG. 3, the AS' and SBL values for tiles 301, 302, 303, 304, 306, 307, 308, 309 can all be used to determine smoothed AS' and SBL values for the middle tile 305. The weights can represent a two-dimensional Gaussian function or some other spatial distribution.

Further, some embodiments may use a temporal filter (114) to provide smoothing between tiles over time, as the spatial smoothing described above can have an influence on nearby tiles even when not desired. For instance, if part of a frame changes rapidly, the rapid change can affect pixels that are not changing. As an example, pixels that are changing within a certain portion of a video window can cause fluctuations in the otherwise fixed pixels in another portion of the video (e.g., in the background). To overcome these effects, a temporal infinite impulse response (IIR) filter can be used to smoothen sharp changes of AS' and SBL over time. These temporally smoothened AS' and SBL values can then be used in the determination of the output luma for the enhanced image.

Figure 3:
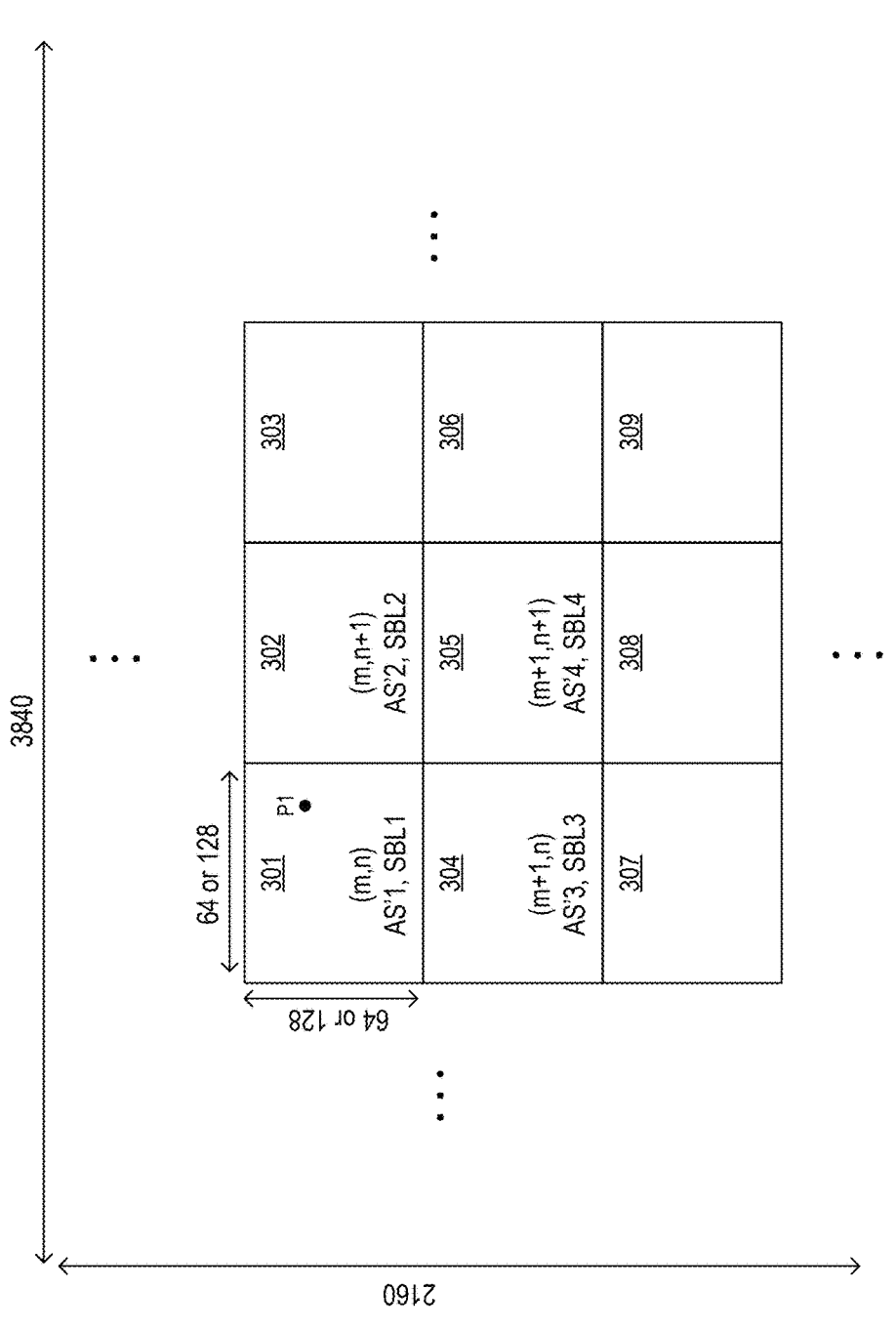
FIG. 3 illustrates neighboring tiles of a display frame that can be considered in a bilinear interpolation in the enhancement techniques of the present disclosure.

In certain embodiments, bilinear interpolation can be performed for each pixel (e.g., at 120). FIG. 3 illustrates example neighboring tiles of a display frame that can be considered in a bilinear interpolation in the enhancement techniques of the present disclosure. Consider a current pixel "P1" shown in FIG. 3. The position of "P1" in the tile 301 can be interpolated from the current tile 301 and its neighboring tiles 302, 304, 305. As an example, the output luma can be computed using two linear interpolations between (1) a first tile and a second tile of the four tiles and (2) a third tile and fourth tile of the four neighboring tiles, with these two interpolations then being combined. That is, the OutLuma value (e.g., the one described above) can be determined 4 times using the current pixel's Luma (InLuma)

and (AS', SBL) from four tiles surrounding the current pixel (i.e., (AS'1, SBL1), (AS'2, SBL2), (AS'3, SBL3), (AS'4, SBL4) shown in FIG. 3 for the pixel P1. The resultant four values (OutLuma1, OutLuma2, OutLuma3, OutLuma4 for tiles 301, 302, 304, 305, respectively) can be bilinearly interpolated to get a final OutLuma' value, e.g., as:

$$OutLuma' =$$
$$\text{Bilinear Interpolation } (OutLuma1, OutLuma2, OutLuma3, OutLuma4).$$

A boost factor (LumaBoost) can then be determined (at 122) based on the ratio of the interpolated output luma (OutLuma') and the input luma values (InLuma):

$$LumaBoost = L'out/Lin$$

and an output RGB value (RGBOut) for the pixel can then be determined (at 124) using the boost factor, e.g., as:

$$RGBout = LumaBoost * RGBin$$

FIG. 4 illustrates a flow diagram of an example process 400 of modifying an image to be displayed to enhance contrast in accordance with embodiments of the present disclosure. The process 400 may include additional, fewer, or different operations than those shown or described below. In some embodiments, one or more of the operations shown include multiple operations, sub-operations, etc. Particular embodiments may include hardware circuitry (e.g., display engine circuitry or timing controller circuitry as described) to implement one or more of the operations shown. In some embodiments, instructions may be encoded one or more computer-readable media so that, when executed, the instructions implement one or more of the operations shown.

At 402, frame data is accessed, e.g., from system memory (e.g., system random access memory (RAM)) or other memory. The frame data may have been previously generated by a graphics processing unit or other processing circuitry for display and stored in the memory. At 404, the frame is divided into a number of tiles as described above, and a tile brightness value is determined along with a tile contrast value. The tile brightness value may be based on an average luma for the constituent pixels of the tile, while the tile contrast value may be based on a tile histogram of luma values, e.g., as described above. In some embodiments, the tile contrast value may involve thresholding so that outlier tiles (dim or bright) might not be considered, e.g., as described above.

At 406, first enhancement factors and second enhancement factors may be obtained for each tile. The enhancement factors may be obtained from lookup tables based on the tile brightness and contrast values as described above. For example, $alpha_{brightness}$ may be the first enhancement factor obtained from FBLUT and $alpha_{contrast}$ may be the second enhancement factor obtained from FCLUT. Accordingly, the first enhancement factor may be a brightness dependent factor and the second enhancement factor may be a contrast dependent factor.

At 408, AS' and SBL values can be determined for each tile based on the obtained enhancement factors/alpha values.

The AS' and SBL values may be determined as described above. These values may be stored in the system memory (e.g., RAM). At 410, spatial filtering/smoothing can be performed using AS' and SBL values of neighboring tiles, and at 412, temporal filtering/smoothing can be performed on the AS' and SBL values as described above.

At 414, an output frame is generated using the AS' and SBL values, which include determining output RGB values for display. The output RGB values may be determined by a luma boost factor, e.g., as described above, and the luma boost factor may be based on a ratio of a determined output luma value (for the enhanced image) and an input luma value (from the unenhanced image) for the pixel. In some embodiments, bilinear interpolation of neighboring pixel luma values can be performed to determine the output luma value for each pixel.

Example Computing Systems

Figure 5:
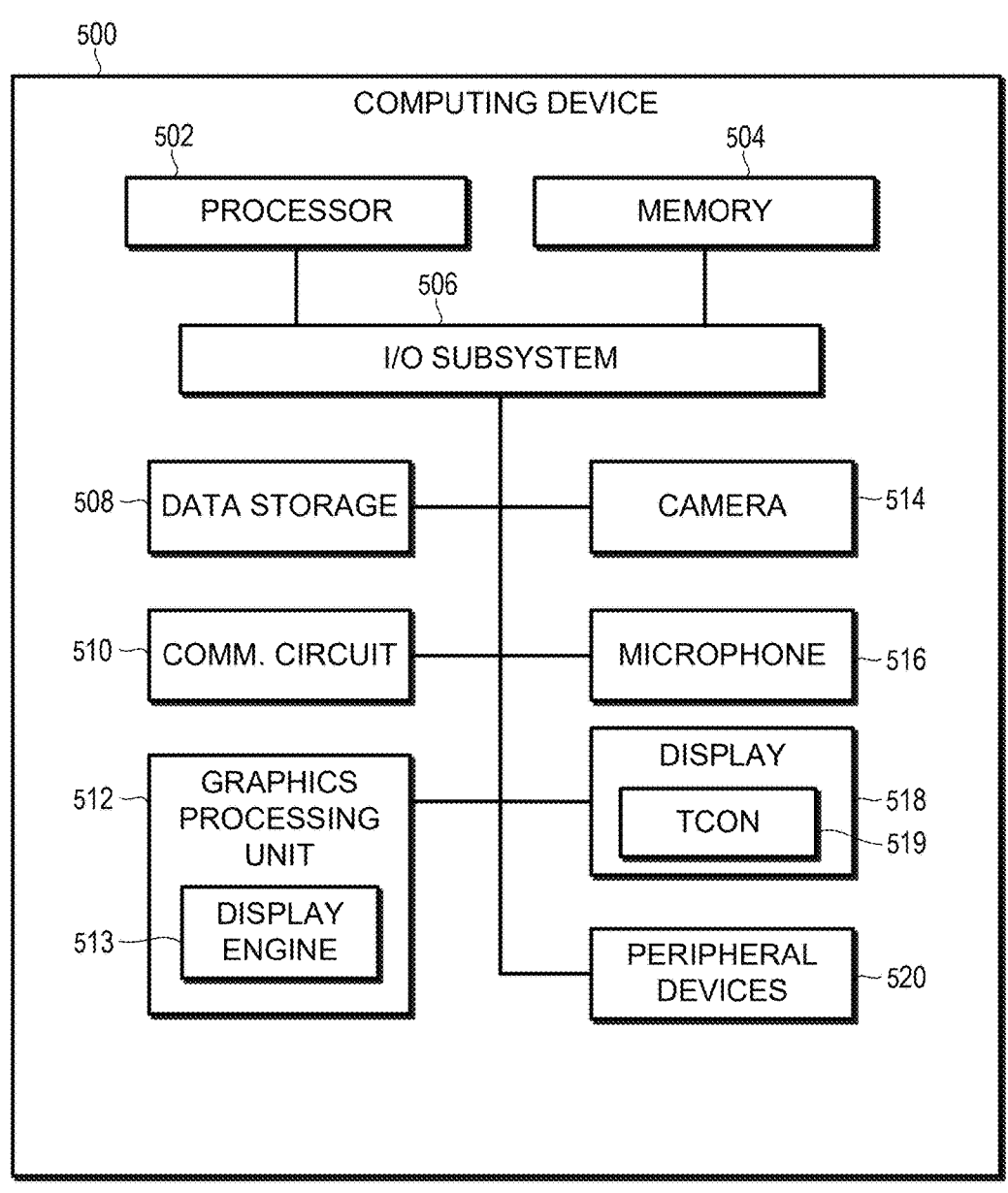
FIG. 5 illustrates a simplified block diagram of a computing device in which aspects of the present disclosure may be incorporated.

FIG. 5 illustrates a simplified block diagram of a computing device in which aspects of the present disclosure may be incorporated. The computing device 500 for selective updating of a display is shown. In use, the illustrative computing device 500 determines one or more regions of a display to be updated. For example, a user may move a cursor and a clock may change from one frame to the next, requiring an update to two regions of a display. The computing device 500 sends update regions from a source to a sink in the display 518 over a link. In the illustrative embodiment, the source does not have direct access to the link port while the sink does have direct access to the link port. The source can send an indication that a particular update message is the last message to be sent for the current frame, after which the source will be entering an idle period without sending update messages. The sink can then place the link in a low-power state to reduce power usage.

The computing device 500 may be embodied as any type of computing device. For example, the computing device 500 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. In some embodiments, the computing device 500 may be located in a data center, such as an enterprise data center (e.g., a data center owned and operated by a company and typically located on company premises), managed services data center (e.g., a data center managed by a third party on behalf of a company), a co-located data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

The illustrative computing device 500 includes a processor 502, a memory 504, an input/output (I/O) subsystem 506, data storage 508, a communication circuit 510, a graphics processing unit 512, a camera 514, a microphone 516, a display 518, and one or more peripheral devices 520. In some embodiments, one or more of the illustrative components of the computing device 500 may be incorporated in, or otherwise form a portion of, another component.

For example, the memory 504, or portions thereof, may be incorporated in the processor 502 in some embodiments. In some embodiments, one or more of the illustrative components may be physically separated from another component.

The processor 502 may be embodied as any type of processor capable of performing the functions described herein. For example, the processor 502 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 504 may be embodied as any type of volatile or non-volatile memory or data storage capable of performing the functions described herein. In operation, the memory 504 may store various data and software used during operation of the computing device 500 such as operating systems, applications, programs, libraries, and drivers. The memory 504 is communicatively coupled to the processor 502 via the I/O subsystem 506, which may be embodied as circuitry and/or components to facilitate input/output operations with the processor 502, the memory 504, and other components of the computing device 500. For example, the I/O subsystem 506 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 506 may connect various internal and external components of the computing device 500 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 506 may form a portion of a system-on-a-chip (SoC) and be incorporated, along with the processor 502, the memory 504, and other components of the computing device 500 on a single integrated circuit chip.

The data storage 508 may be embodied as any type of device or devices configured for the short-term or long-term storage of data. For example, the data storage 508 may include any one or more memory devices and circuits, memory cards, hard disk drives, solid-state drives, or other data storage devices.

The communication circuit 510 may be embodied as any type of interface capable of interfacing the computing device 500 with other computing devices, such as over one or more wired or wireless connections. In some embodiments, the communication circuit 510 may be capable of interfacing with any appropriate cable type, such as an electrical cable or an optical cable. The communication circuit 510 may be configured to use any one or more communication technology and associated protocols (e.g., Ethernet, Bluetooth®, Wi-Fi®, WiMAX, near field communication (NFC), etc.). The communication circuit 510 may be located on silicon separate from the processor 502, or the communication circuit 510 may be included in a multi-chip package with the processor 502, or even on the same die as the processor 502. The communication circuit 510 may be embodied as one or more add-in-boards, daughtercards, network interface cards, controller chips, chipsets, specialized components such as a field-programmable gate array (FPGA) or application-specific integrated circuit (ASIC), or other devices that may be used by the computing device 500 to connect with another computing device. In some embodiments, communication circuit 510 may be embodied as part of a system-on-a-chip (SoC) that includes one or more processors or included on a multichip package that also contains one or more processors. In some embodiments, the communication circuit 510 may include a local processor (not shown) and/or a local memory (not shown) that are both local to the communication circuit 510. In such embodiments, the local processor of the communication circuit 510 may be capable of performing one or more of the functions of the processor 502 described herein. Additionally or alternatively, in such embodiments, the local memory of the communication circuit 510 may be integrated into one or more components of the computing device 500 at the board level, socket level, chip level, and/or other levels.

The graphics processing unit 512 is configured to perform certain computing tasks, such as video or graphics processing. The graphics processing unit 512 may be embodied as one or more processors, data processing unit, field-programmable gate arrays (FPGAs), application-specific integrated circuits (ASICs), and/or any combination of the above. In some embodiments, the graphics processing unit 512 may send frames or partial update regions to the display 518. For instance, the example graphics processing unit 512 includes a display engine 513, which may be embodied as hardware, firmware, software, virtualized hardware, emulated architecture, and/or a combination thereof, and is configured to determine frames to be sent to the display 518 and send the images to the display 518. In the illustrative embodiment, the display engine 513 is part of the graphics processing unit 512. In other embodiments, the display engine 513 may be part of the processor 502 or other component of the device 500.

In certain embodiments, the display engine 513 may include circuitry to implement aspects of the present disclosure, e.g., circuitry to implement the computational aspects described with respect to FIG. 1 above. For example, the display engine 513 may access frames stored in the memory 504, enhance the frames as described above, and then stream the frames to the display 518.

The camera 514 may include one or more fixed or adjustable lenses and one or more image sensors. The image sensors may be any suitable type of image sensors, such as a CMOS or CCD image sensor. The camera 514 may have any suitable aperture, focal length, field of view, etc. For example, the camera 514 may have a field of view of 60-110° in the azimuthal and/or elevation directions.

The microphone 516 is configured to sense sound waves and output an electrical signal indicative of the sound waves. In the illustrative embodiment, the computing device 500 may have more than one microphone 516, such as an array of microphones 516 in different positions.

The display 518 may be embodied as any type of display on which information may be displayed to a user of the computing device 500, such as a touchscreen display, a liquid crystal display (LCD), a thin film transistor LCD (TFT-LCD), a light-emitting diode (LED) display, an organic light-emitting diode (OLED) display, a cathode ray tube (CRT) display, a plasma display, an image projector (e.g., 2D or 3D), a laser projector, a heads-up display, and/or other display technology. The display 518 may have any suitable resolution, such as 7680×4320, 3840×2160, 1920×1200, 1920×1080, etc.

The display 518 includes a timing controller (TCON) 519, which includes circuitry to convert video data received from the graphics processing unit 512 into signals that drive a panel of the display 518. In some embodiments, the TCON 519 may also include circuitry to implement one or more aspects of the present disclosure. For example, the TCON 519 may include circuitry to implement the computational aspects described with respect to FIG. 1 above. For example, the TCON 519 may enhance frames received from the graphics processing unit 512 and stream the frames to the panel of the display 518.

In some embodiments, the computing device 500 may include other or additional components, such as those commonly found in a computing device. For example, the computing device 500 may also have peripheral devices 520, such as a keyboard, a mouse, a speaker, an external storage device, etc. In some embodiments, the computing device 500 may be connected to a dock that can interface with various devices, including peripheral devices 520. In some embodiments, the peripheral devices 520 may include additional sensors that the computing device 500 can use to monitor the video conference, such as a time-of-flight sensor or a millimeter-wave sensor.

Figure 6:
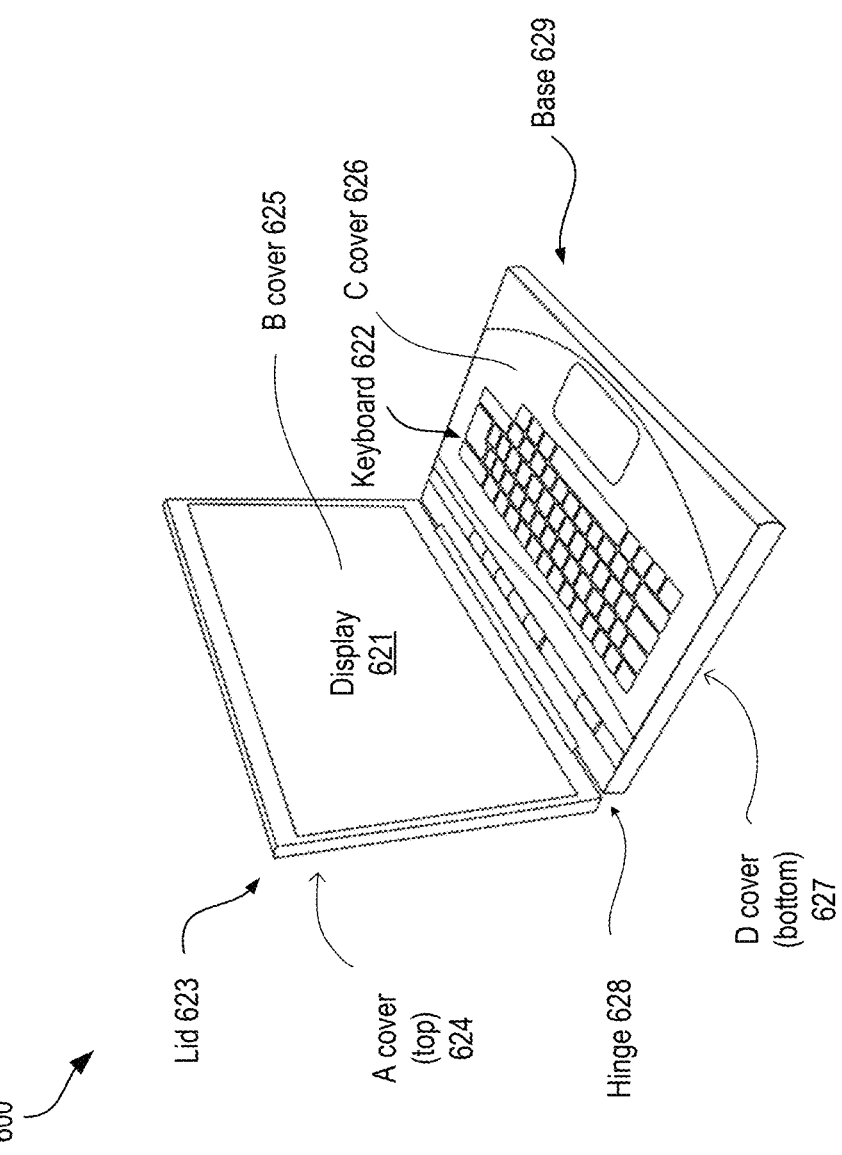
FIG. 6 illustrates an example computing device in which aspects of the present disclosure may be incorporated.

FIG. 6 illustrates an example computing device 600 in which aspects of the present disclosure may be incorporated. The computing device 600 can be a laptop (as shown) or another type of mobile computing device with a similar form factor, such as a foldable tablet or smartphone. In some embodiments, embodiments of present disclosure may be incorporated into a free-standing display monitor, which may be connected to a computing device that outputs image data to the display.

The computing device 600 includes a housing, which includes a lid 623 with an A cover 624 that is a "world-facing" surface of the lid 623 when the computing device 600 is in a closed configuration and a B cover 625 that comprises a user-facing display 621 when the lid 623 is open (e.g., as shown). The computing device 600 also includes a base 629 with a C cover 626 that includes a keyboard 622 that is upward facing when the device 600 is an open configuration (e.g., as shown) and a D cover 627 that forms the bottom of the base 629. In some embodiments, the base 629 includes the primary computing resources (e.g., host processor unit(s), graphics processing unit (GPU)) of the device 600, along with a battery, memory, and storage, and communicates with the lid 623 via wires that pass through a hinge 628 that connects the base 629 with the lid 623. In some embodiments, the computing device 600 can be a dual display device with a second display comprising a portion of the C cover 626. For example, in some embodiments, an "always-on" display (AOD) can occupy a region of the C cover below the keyboard that is visible when the lid 623 is closed. In other embodiments, a second display covers most of the surface of the C cover and a removable keyboard can be placed over the second display or the second display can present a virtual keyboard to allow for keyboard input.

FIG. 7 illustrates an example block diagram of a computing device in which aspects of the present disclosure may be incorporated. The computing device 700 comprises a base 710 connected to a lid 720 by a hinge 730. The mobile computing device (also referred to herein as "user device") 700 can be a laptop or a mobile computing device with a similar form factor. The base 710 comprises a host system-on-a-chip (SoC) 740 that comprises one or more processor units integrated with one or more additional components, such as a memory controller, graphics processing unit (GPU), caches, an image processing module, and other components described herein. For example, the SoC 740 may include one or more of the processor 502, memory 504, I/O subsystem 506, and graphics processing unit 512 of FIG. 5. The base 710 can further comprise a physical keyboard, touchpad, battery, memory, storage, and external ports. The lid 720 comprises an embedded display panel 745, a timing controller (TCON) 750, one or more microphones 758, one or more cameras 760, and a touch controller 765. The TCON 750 converts video data 790 received from the SoC 740 into signals that drive the display panel 745.

The display panel 745 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. The display panel 745 can comprise a touchscreen comprising one or more dedicated layers for implementing touch capabilities or 'in-cell' or 'on-cell' touchscreen technologies that do not require dedicated touchscreen layers. A touch controller 765 drives touchscreen technology utilized in the display panel 745 and collects touch sensor data provided by the employed touchscreen technology. The microphones 758 can comprise microphones located in the bezel of the lid or in-display microphones located in the display area, the region of the panel that displays content. The one or more cameras 760 can similarly comprise cameras located in the bezel or in-display cameras located in the display area.

The hinge 730 can be any physical hinge that allows the base 710 and the lid 720 to be rotatably connected. The wires that pass across the hinge 730 comprise wires for passing video data from the SoC 740 to the TCON 750, wires for passing audio data between the microphones 758 and the SoC 740, wires for providing image data from the cameras 760 to the SoC 740, and wires for providing touch data from the touch controller 765 to the SoC 740. In some embodiments, data shown as being passed over different sets of wires between the SoC and various components are communicated over the same set of wires. For example, in some embodiments, all of the different types of data shown can be sent over a single PCIe-based or USB-based data bus. In some embodiments, the lid 720 is removably attachable to the base 710. In some embodiments, the hinge can allow the base 710 and the lid 720 to rotate to substantially 360 degrees with respect to each other.

The components illustrated in FIG. 7 as being located in the base of a mobile computing device can be located in a base housing (e.g., base 629 of the device 600) and components illustrated in FIG. 7 as being located in the lid of a mobile computing device can be located in a lid housing (e.g., lid 623 of the device 600).

Figure 8:
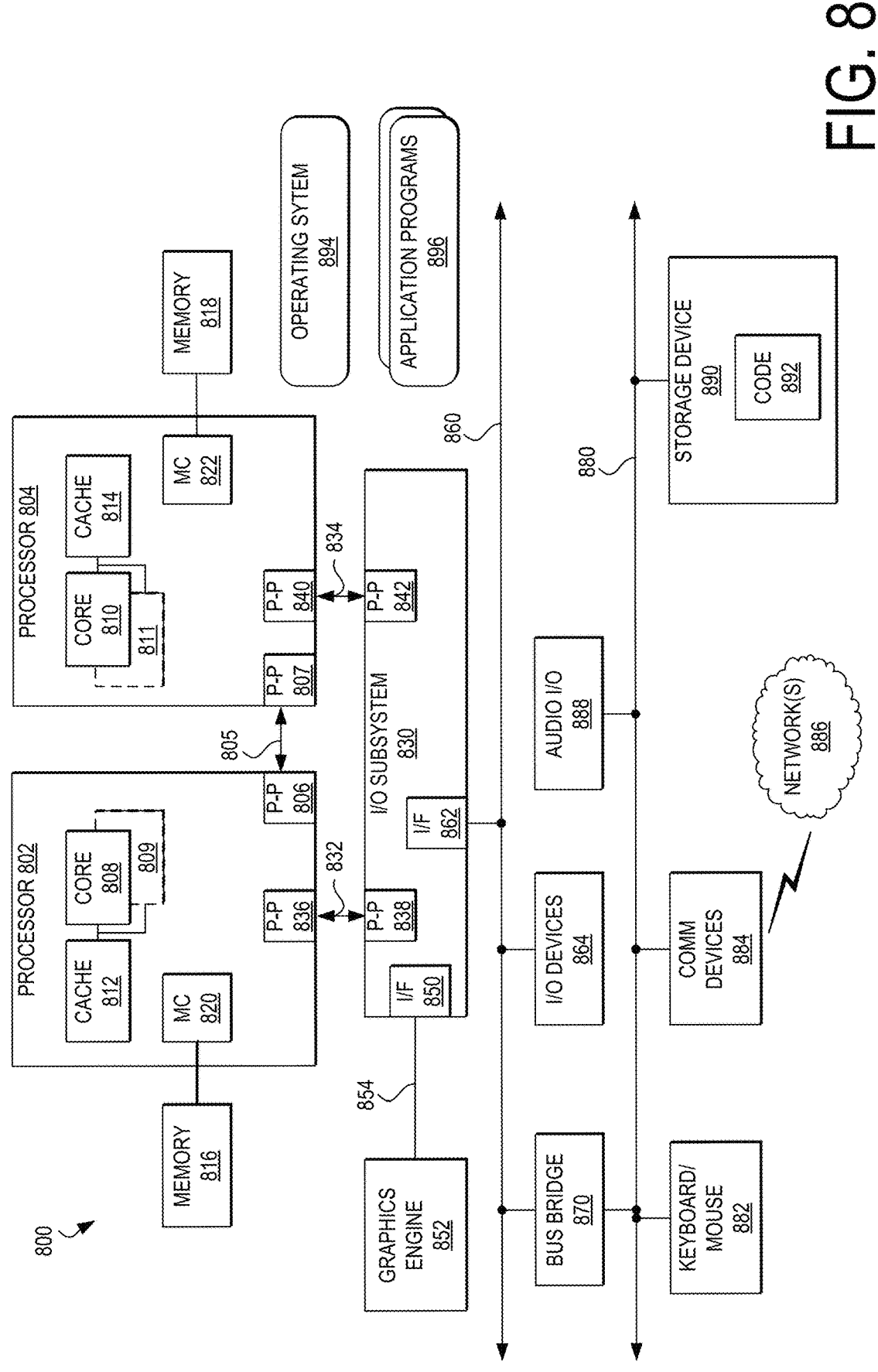
FIG. 8 is a block diagram of computing device components which may be included in a mobile computing device incorporating aspects of the present disclosure.

FIG. 8 is a block diagram of computing device components which may be included in a mobile computing device incorporating aspects of the present disclosure. In some embodiments, the components shown may be implemented within the SoC 740 of FIG. 7, for instance. Generally, components shown in FIG. 8 can communicate with other shown components, although not all connections are shown, for ease of illustration. The components 800 comprise a multiprocessor system comprising a first processor 802 and a second processor 804 and is illustrated as comprising point-to-point (P-P) interconnects. For example, a point-to-point (P-P) interface 806 of the processor 802 is coupled to a point-to-point interface 807 of the processor 804 via a point-to-point interconnection 805. It is to be understood that any or all of the point-to-point interconnects illustrated in FIG. 8 can be alternatively implemented as a multi-drop bus, and that any or all buses illustrated in FIG. 8 could be replaced by point-to-point interconnects.

As shown in FIG. 8, the processors 802 and 804 are multicore processors. Processor 802 comprises processor cores 808 and 809, and processor 804 comprises processor cores 810 and 811. Processor cores 808-811 can execute computer-executable instructions in a manner similar to that discussed below in connection with FIG. 9, or in other manners.

Processors 802 and 804 further comprise at least one shared cache memory 812 and 814, respectively. The shared caches 812 and 814 can store data (e.g., instructions) utilized by one or more components of the processor, such as the processor cores 808-809 and 810-811. The shared caches 812 and 814 can be part of a memory hierarchy for the device. For example, the shared cache 812 can locally store data that is also stored in a memory 816 to allow for faster access to the data by components of the processor 802. In some embodiments, the shared caches 812 and 814 can comprise multiple cache layers, such as level 1 (L1), level 2 (L2), level 3 (L3), level 4 (L4), and/or other caches or cache layers, such as a last level cache (LLC).

Although two processors are shown, the device can comprise any number of processors or other compute resources. Further, a processor can comprise any number of processor cores. A processor can take various forms such as a central processing unit, a controller, a graphics processor, an accelerator (such as a graphics accelerator, digital signal processor (DSP), or artificial intelligence (AI) accelerator)). A processor in a device can be the same as or different from other processors in the device. In some embodiments, the device can comprise one or more processors that are heterogeneous or asymmetric to a first processor, accelerator, field programmable gate array (FPGA), or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 802 and 804 reside in a multi-chip package. As used herein, the terms "processor unit" and "processing unit" can refer to any processor, processor core, component, module, engine, circuitry or any other processing element described herein. A processor unit or processing unit can be implemented in hardware, software, firmware, or any combination thereof.

Processors 802 and 804 further comprise memory controller logic (MC) 820 and 822. As shown in FIG. 8, MCs 820 and 822 control memories 816 and 818 coupled to the processors 802 and 804, respectively. The memories 816 and 818 can comprise various types of memories, such as volatile memory (e.g., dynamic random-access memories (DRAM), static random-access memory (SRAM)) or non-volatile memory (e.g., flash memory, solid-state drives, chalcogenide-based phase-change non-volatile memories). While MCs 820 and 822 are illustrated as being integrated into the processors 802 and 804, in alternative embodiments, the MCs can be logic external to a processor, and can comprise one or more layers of a memory hierarchy.

Processors 802 and 804 are coupled to an Input/Output (I/O) subsystem 830 via P-P interconnections 832 and 834. The point-to-point interconnection 832 connects a point-to-point interface 836 of the processor 802 with a point-to-point interface 838 of the I/O subsystem 830, and the point-to-point interconnection 834 connects a point-to-point interface 840 of the processor 804 with a point-to-point interface 842 of the I/O subsystem 830. Input/Output subsystem 830 further includes an interface 850 to couple I/O subsystem 830 to a graphics module 852, which can be a high-performance graphics module. The I/O subsystem 830 and the graphics module 852 are coupled via a bus 854. Alternately, the bus 854 could be a point-to-point interconnection.

Input/Output subsystem 830 is further coupled to a first bus 860 via an interface 862. The first bus 860 can be a Peripheral Component Interconnect (PCI) bus, a PCI Express (PCIe) bus, another third generation I/O (input/output) interconnection bus or any other type of bus.

Various I/O devices 864 can be coupled to the first bus 860. A bus bridge 870 can couple the first bus 860 to a second bus 880. In some embodiments, the second bus 880 can be a low pin count (LPC) bus. Various devices can be coupled to the second bus 880 including, for example, a keyboard/mouse 882, audio I/O devices 888 and a storage device 890, such as a hard disk drive, solid-state drive or other storage device for storing computer-executable instructions (code) 892. The code 892 can comprise computer-executable instructions for performing technologies described herein. Additional components that can be coupled to the second bus 880 include communication device(s) or components 884, which can provide for communication between the device and one or more wired or wireless networks 886 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device can comprise removable memory such as flash memory cards (e.g., SD (Secure Digital) cards), memory sticks, Subscriber Identity Module (SIM) cards). The memory in the computing device (including caches 812 and 814, memories 816 and 818 and storage device 890) can store data and/or computer-executable instructions for executing an operating system 894, or application programs 896. Example data includes web pages, text messages, images, sound files, video data, sensor data, or other data sets to be sent to and/or received from one or more network servers or other devices by the device via one or more wired or wireless networks, or for use by the device. The device can also have access to external memory (not shown) such as external hard drives or cloud-based storage.

The operating system 894 can control the allocation and usage of the components illustrated in FIG. 8 and support one or more application programs 896. The application programs 896 can include common mobile computing device applications (e.g., email applications, calendars, contact managers, web browsers, messaging applications) as well as other computing applications.

The device can support various input devices, such as a touchscreen, microphones, cameras (monoscopic or stereoscopic), trackball, touchpad, trackpad, mouse, keyboard, proximity sensor, light sensor, pressure sensor, infrared sensor, electrocardiogram (ECG) sensor, PPG (photoplethysmogram) sensor, galvanic skin response sensor, and one or more output devices, such as one or more speakers or displays. Any of the input or output devices can be internal to, external to or removably attachable with the device. External input and output devices can communicate with the device via wired or wireless connections.

In addition, the computing device can provide one or more natural user interfaces (NUIs). For example, the operating system 894 or application programs 896 can comprise speech recognition as part of a voice user interface that allows a user to operate the device via voice commands.

Further, the device can comprise input devices and components that allows a user to interact with the device via body, hand, or face gestures.

The device can further comprise one or more communication components 884. The components 884 can comprise wireless communication components coupled to one or more antennas to support communication between the device and external devices. Antennas can be located in a base, lid, or other portion of the device. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device can further include at least one input/output port (which can be, for example, a USB, IEEE 1394 (FireWire), Ethernet and/or RS-232 port) comprising physical connectors (such as a rechargeable battery); a power supply (such as a rechargeable battery); a satellite navigation system receiver, such as a GPS receiver; a gyroscope; an accelerometer; and a compass. A GPS receiver can be coupled to a GPS antenna. The device can further include one or more additional antennas coupled to one or more additional receivers, transmitters and/or transceivers to enable additional functions.

FIG. 8 illustrates one example computing device architecture. Computing devices based on alternative architectures can be used to implement technologies described herein. For example, instead of the processors 802 and 804, and the graphics module 852 being located on discrete integrated circuits, a computing device can comprise a SoC (system-on-a-chip) integrated circuit incorporating one or more of the components illustrated in FIG. 8. In one example, an SoC can comprise multiple processor cores, cache memory, a display driver, a GPU, multiple I/O controllers, an AI accelerator, and an image processing unit driver. Further, a computing device can connect elements via bus or point-to-point configurations different from that shown in FIG. 8. Moreover, the illustrated components in FIG. 8 are not required or all-inclusive, as shown components can be removed and other components added in alternative embodiments.

Figure 9:
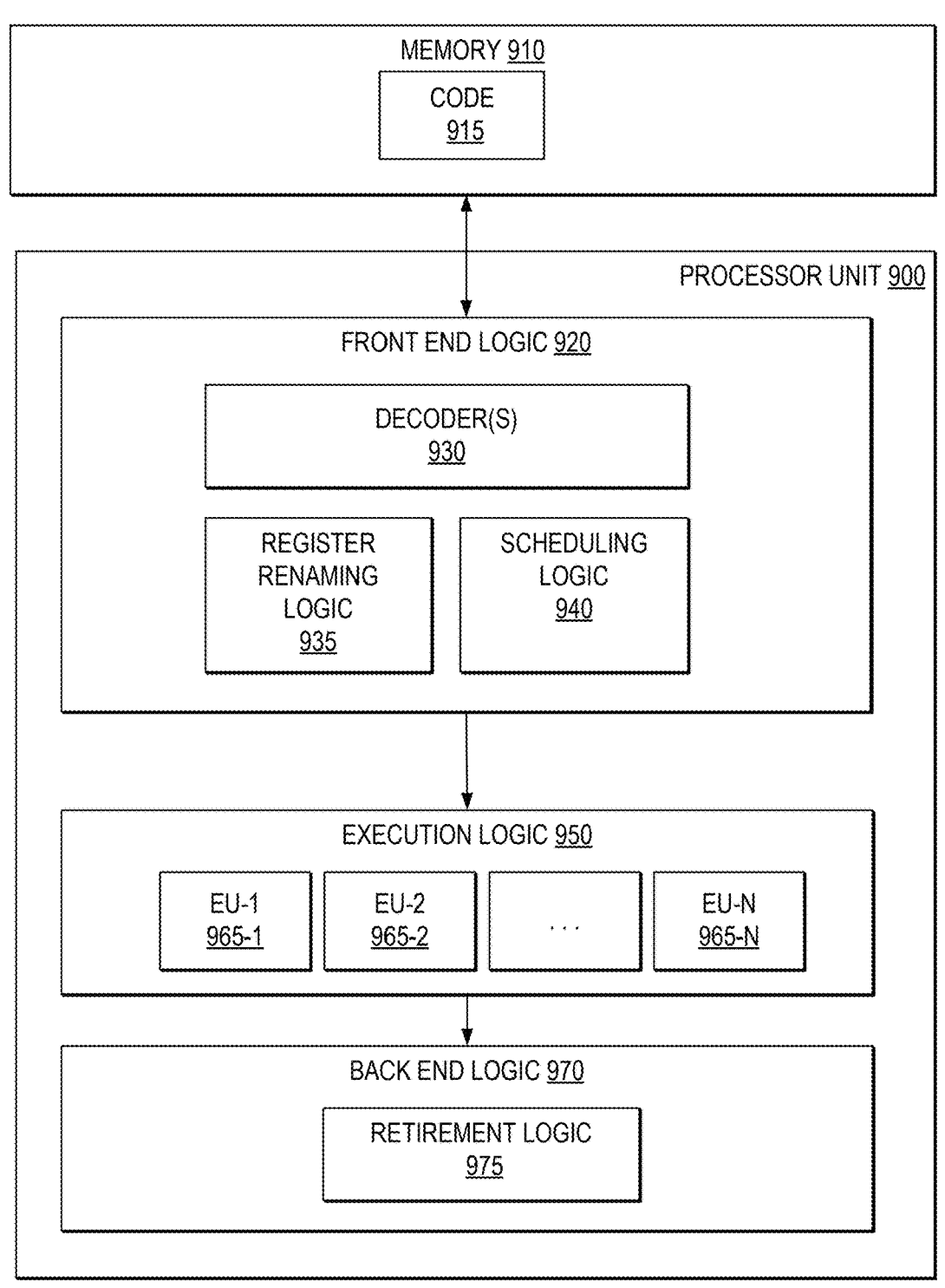
FIG. 9 is a block diagram of an exemplary processor unit that can execute instructions.

FIG. 9 is a block diagram of an example processor unit 900 to execute computer-executable instructions. The processor unit 900 can be any type of processor or processor core, such as a microprocessor, an embedded processor, a digital signal processor (DSP), network processor, or accelerator. The processor unit 900 can be a single-threaded core or a multithreaded core in that it may include more than one hardware thread context (or "logical processor") per core.

FIG. 9 also illustrates a memory 910 coupled to the processor 900. The memory 910 can be any memory described herein or any other memory known to those of skill in the art. The memory 910 can store computer-executable instructions 915 (code) executable by the processor unit 900.

The processor core comprises front-end logic 920 that receives instructions from the memory 910. An instruction can be processed by one or more decoders 930. The decoder 930 can generate as its output a micro operation such as a fixed width micro operation in a predefined format, or generate other instructions, microinstructions, or control signals, which reflect the original code instruction. The front-end logic 920 further comprises register renaming logic 935 and scheduling logic 940, which generally allocate resources and queues operations corresponding to converting an instruction for execution.

The processor unit 900 further comprises execution logic 950, which comprises one or more execution units (EUs) 965-1 through 965-N. Some processor core embodiments can include a number of execution units dedicated to specific functions or sets of functions. Other embodiments can include only one execution unit or one execution unit that can perform a particular function. The execution logic 950 performs the operations specified by code instructions. After completion of execution of the operations specified by the code instructions, back end logic 970 retires instructions using retirement logic 975. In some embodiments, the processor unit 900 allows out of order execution but requires in-order retirement of instructions. Retirement logic 975 can take a variety of forms as known to those of skill in the art (e.g., re-order buffers or the like).

The processor unit 900 is transformed during execution of instructions, at least in terms of the output generated by the decoder 930, hardware registers and tables utilized by the register renaming logic 935, and any registers (not shown) modified by the execution logic 950. Although not illustrated in FIG. 9, a processor can include other elements on an integrated chip with the processor unit 900. For example, a processor may include additional elements such as memory control logic, one or more graphics modules, I/O control logic modules and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer-readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hard-wired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

The use of reference numbers in the claims and the specification is meant as in an aid in understanding the claims and the specification and is not meant to be limiting.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B, and C. Further, as used in this application and in the claims, a list of items joined by the term "at least one of" can mean any combination of the listed terms. For example, the phrase "at least one of A, B, or C" can mean A; B; C; A and B; A and C; B and C; or A, B, and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Certain non-limiting examples of the presently described techniques are provided below. Each of the following non-limiting examples may stand on its own or may be combined in any permutation or combination with any one or more of the other examples provided below or throughout the present disclosure.

Example 1 is an apparatus comprising: graphics processing circuitry to: access an input frame of image data; determine a tile brightness value and a tile contrast value for each respective tile of a plurality of tiles that together comprise the input frame; obtain, e.g., from a first lookup table, a first enhancement factor based on the tile brightness value; obtain, e.g., from a second lookup table, a second enhancement factor based on the tile contrast value; and generate an output frame based on the first enhancement factor and the second enhancement factor.

Example 2 includes the subject matter of Example 1, wherein the circuitry is further to determine, for each respective tile: an adaptive strength (AS) value by multiplying the first enhancement factor, the second enhancement factor, and a fixed value; and a scaled blurred luma (SBL) value by multiplying the AS value with an average luma value for the tile; wherein the output frame is generated based on the AS values and SBL values.

Example 3 includes the subject matter of Example 1 or 2, wherein respective pixels of the output frame are generated based on multiplying an input luma value of the pixel by the AS value corresponding to the frame of the pixel and subtracting the SBL value corresponding to the frame of the pixel.

Example 4 includes the subject matter of any one of Examples 1-3, wherein the circuitry is to determine the tile contrast value based on a histogram of brightness for pixels of the tile.

Example 5 includes the subject matter of any one of Examples 1-4, wherein the circuitry is to determine the tile brightness value by averaging luma values of the pixels of the tile.

Example 6 includes the subject matter of any one of Examples 2-5, wherein the circuitry is further to perform temporal smoothing of the AS and SBL values using an infinite impulse response (IIR) filter to generate the output frame.

Example 7 includes the subject matter of any one of Examples 1-6, wherein the circuitry is to perform bilinear interpolation of output luma values of neighboring pixels to generate pixel luma values of the output frame.

Example 8 includes the subject matter of any one of Examples 1-7, wherein the circuitry is further to: determine a luma boost factor for each pixel based on an input luma value for the pixel and an output luma value for the pixel that is based on the first enhancement factor and the second enhancement factor; and generate the output frame by applying the luma boost factor to an input RGB value for each pixel.

Example 9 is a system comprising: a display; and circuitry coupled to the display to: access an input frame of image data; determine a tile brightness value and a tile contrast value for each respective tile of a plurality of tiles that together comprise the input frame; obtain, e.g., from a first lookup table, a first enhancement factor based on the tile brightness value; obtain, e.g., from a second lookup table, a second enhancement factor based on the tile contrast value; generate an output frame based on the first enhancement factor and the second enhancement factor; and cause the output frame to be displayed on the display.

Example 10 includes the subject matter of Example 9, wherein the circuitry is further to determine, for each respective tile: an adaptive strength (AS) value by multiplying the first enhancement factor, the second enhancement factor, and a fixed value; and a scaled blurred luma (SBL) value by multiplying the AS value with an average luma value for the tile; wherein the output frame is generated based on the AS values and SBL values.

Example 11 includes the subject matter of Example 9 or 10, wherein respective pixels of the output frame are generated based on multiplying an input luma value of the pixel by the AS value corresponding to the frame of the pixel and subtracting the SBL value corresponding to the frame of the pixel.

Example 12 includes the subject matter of any one of Examples 9-11, wherein the circuitry is to determine the tile contrast value based on a histogram of brightness for pixels of the tile.

Example 13 includes the subject matter of any one of Examples 9-12, wherein the circuitry is to determine the tile brightness value by averaging luma values of the pixels of the tile.

Example 14 includes the subject matter of any one of Examples 10-13, wherein the circuitry is further to perform temporal smoothing of the AS and SBL values using an infinite impulse response (IIR) filter to generate the output frame.

Example 15 includes the subject matter of any one of Examples 9-14, wherein the circuitry is to perform bilinear interpolation of output luma values of neighboring pixels to generate pixel luma values of the output frame.

Example 16 includes the subject matter of any one of Examples 9-15, wherein the circuitry is further to: determine a luma boost factor for each pixel based on an input luma value for the pixel and an output luma value for the pixel that is based on the first enhancement factor and the second enhancement factor; and generate the output frame by applying the luma boost factor to an input RGB value for each pixel.

Example 17 includes the subject matter of any one of Examples 9-16, wherein the circuitry is within a graphics processing unit (GPU) of the system, and the circuitry is to access the input frame data from memory of the system.

Example 18 includes the subject matter of any one of Examples 9-16, wherein the circuitry is within a timing controller of the system.

Example 19 is a method comprising: receiving an input frame of image data; access an input frame of image data; determining a tile brightness value and a tile contrast value for each respective tile of a plurality of tiles that together comprise the input frame; obtaining, from a first lookup table, a first enhancement factor based on the tile brightness value; obtaining, from a second lookup table, a second enhancement factor based on the tile contrast value; and generating an output frame based on the first enhancement factor and the second enhancement factor.

Example 20 includes the subject matter of Example 19, further comprising determining, for each respective tile: an adaptive strength (AS) value by multiplying the first enhancement factor, the second enhancement factor, and a fixed value; and a scaled blurred luma (SBL) value by multiplying the AS value with an average luma value for the tile; wherein the output frame is generated based on the AS values and SBL values.

Example 21 includes the subject matter of Example 19 or 20, wherein respective pixels of the output frame are generated based on multiplying an input luma value of the pixel by the AS value corresponding to the frame of the pixel, and subtracting the SBL value corresponding to the frame of the pixel.

Example 22 includes the subject matter of any one of Examples 19-21, wherein the tile contrast value is determined based on a histogram of brightness for pixels of the tile.

Example 23 includes the subject matter of any one of Examples 19-22, wherein the tile brightness value is determined by averaging luma values of the pixels of the tile.

Example 24 includes the subject matter of any one of Examples 19-23, further comprising performing temporal smoothing of the AS and SBL values using an infinite impulse response (IIR) filter.

Example 25 includes the subject matter of any one of Examples 19-24, further comprising performing bilinear interpolation of output luma values of neighboring pixels to generate pixel luma values of the output frame.

Example 26 includes the subject matter of any one of Examples 19-25, further comprising: determining a luma boost factor for each pixel based on an input luma value for the pixel and an output luma value for the pixel that is based on the first enhancement factor and the second enhancement factor; and generating the output frame by applying the luma boost factor to an input RGB value for each pixel.

Example 27 includes the subject matter of any one of Examples 19-26, wherein the output frame is generated by circuitry within a graphics processing unit (GPU) of the system.

Example 28 includes the subject matter of any one of Examples 19-26, wherein the output frame is generated by a timing controller (TCON) of a display.

Example 29 includes one or more computer-readable storage media comprising instructions that when executed by processing circuitry cause the processing circuitry to implement the method of any one of Examples 19-28.

Example 30 is an apparatus comprising circuitry to implement the method of any one of Examples 19-28, or to implement any of the other aspects described herein.

Example 31 is a computing system comprising circuitry to implement the apparatus of any one of Examples 1-8, circuitry to implement the method of any one of Examples 19-28, or to implement any of the other aspects described herein.

Example 32 includes the subject matter of any preceding Example, wherein the first lookup table includes a generally decreasing set of values across its indices, and the second lookup table includes a generally or substantially Gaussian distribution of values across its indices.

The invention claimed is:

1. An apparatus comprising:
   graphics processing circuitry to:
       access an input frame of image data;
       determine a tile brightness value and a tile contrast value for each respective tile of a plurality of tiles that together comprise the input frame;
       obtain a first enhancement factor based on the tile brightness value;

obtain a second enhancement factor based on the tile contrast value;

determine, for each respective tile of the plurality of tiles, an adaptive strength (AS) value by multiplying the first enhancement factor, the second enhancement factor, and a fixed value, and a scaled blurred luma (SBL) value by multiplying the AS value with an average luma value for the tile; and generate an output frame based on the AS values and the SBL values.

2. The apparatus of claim 1, wherein respective pixels of the output frame are generated based on multiplying an input luma value of the pixel by the AS value corresponding to the frame of the pixel and subtracting the SBL value corresponding to the frame of the pixel.

3. The apparatus of claim 1, wherein the circuitry is further to perform temporal smoothing of the AS and SBL values using an infinite impulse response (IIR) filter to generate the output frame.

4. The apparatus of claim 1, wherein the circuitry is to determine the tile contrast value based on a histogram of brightness for pixels of the tile.

5. The apparatus of claim 1, wherein the circuitry is to determine the tile brightness value by averaging luma values of pixels of the tile.

6. The apparatus of claim 1, wherein the circuitry is to perform bilinear interpolation of output luma values of neighboring pixels to generate pixel luma values of the output frame.

7. The apparatus of claim 1, wherein the circuitry is further to:

determine a luma boost factor for each pixel based on an input luma value for the pixel and an output luma value for the pixel that is based on the first enhancement factor and the second enhancement factor; and generate the output frame by applying the luma boost factor to an input RGB value for each pixel.

8. The apparatus of claim 1, wherein the first enhancement factor is obtained from a first lookup table, and the second enhancement factor is obtained from a second lookup table.

9. A system comprising:

a display; and hardware circuitry coupled to the display to:

access an input frame of image data;

determine a tile brightness value and a tile contrast value for each respective tile of a plurality of tiles that together comprise the input frame;

obtain a first enhancement factor based on the tile brightness value;

obtain a second enhancement factor based on the tile contrast value;

determine, for each respective tile of the plurality of tiles, an adaptive strength (AS) value by multiplying the first enhancement factor, the second enhancement factor, and a fixed value, and a scaled blurred luma (SBL) value by multiplying the AS value with an average luma value for the tile;

generate an output frame based on the AS values and the SBL values; and cause the output frame to be displayed on the display.

10. The system of claim 9, wherein respective pixels of the output frame are generated based on multiplying an input luma value of the pixel by the AS value corresponding to the frame of the pixel and subtracting the SBL value corresponding to the frame of the pixel.

11. The system of claim 10, wherein the circuitry is further to perform temporal smoothing of the AS and SBL values using an infinite impulse response (IIR) filter to generate the output frame.

12. The system of claim 9, wherein the circuitry is to perform bilinear interpolation of output luma values of neighboring pixels to generate pixel luma values of the output frame.

13. The system of claim 9, wherein the circuitry is further to:

determine a luma boost factor for each pixel based on an input luma value for the pixel and an output luma value for the pixel that is based on the first enhancement factor and the second enhancement factor; and generate the output frame by applying the luma boost factor to an input RGB value for each pixel.

14. The system of claim 9, wherein the circuitry is within a graphics processing unit (GPU) of the system, and the circuitry is to access the input frame data from memory of the system.

15. The system of claim 9, wherein the circuitry is within a timing controller of the system.

16. The system of claim 9, wherein the first enhancement factor is obtained from a first lookup table and the second enhancement factor is obtained from a second lookup table.

17. A method comprising:

receiving an input frame of image data;

determining a tile brightness value and a tile contrast value for each respective tile of a plurality of tiles that together comprise the input frame;

obtaining, from a first lookup table, a first enhancement factor based on the tile brightness value;

obtaining, from a second lookup table, a second enhancement factor based on the tile contrast value;

determine, for each respective tile of the plurality of tiles, an adaptive strength (AS) value by multiplying the first enhancement factor, the second enhancement factor, and a fixed value, and a scaled blurred luma (SBL) value by multiplying the AS value with an average luma value for the tile; and generating an output frame based on the AS values and the SBL values.

18. The method of claim 17, wherein respective pixels of the output frame are generated based on multiplying an input luma value of the pixel by the AS value corresponding to the frame of the pixel, and subtracting the SBL value corresponding to the frame of the pixel.

19. The method of claim 17, further comprising performing temporal smoothing of the AS and SBL values using an infinite impulse response (IIR) filter to generate the output frame.

20. The method of claim 17, wherein the tile contrast value is determined based on a histogram of brightness for pixels of the tile, the tile brightness value is determined by averaging luma values of pixels of the tile, and the method further comprises determining a luma boost factor for each pixel based on an input luma value for the pixel and an output luma value for the pixel that is based on the first enhancement factor and the second enhancement factor, wherein generating the output frame comprises applying the luma boost factor to an input RGB value for each pixel.

* * * * *